US012137325B2

(12) United States Patent
Davidson

(10) Patent No.: US 12,137,325 B2
(45) Date of Patent: *Nov. 5, 2024

(54) EAR MOUNTED AUDIO DEVICES CONTROLLABLE BY REMOTE CONTROL

(71) Applicant: Curt Davidson, San Marcos, CA (US)

(72) Inventor: Curt Davidson, San Marcos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/124,541

(22) Filed: Mar. 21, 2023

(65) Prior Publication Data

US 2023/0292065 A1 Sep. 14, 2023

Related U.S. Application Data

(63) Continuation of application No. 17/954,106, filed on Sep. 27, 2022, now Pat. No. 11,622,213, which is a continuation-in-part of application No. 17/691,020, filed on Mar. 9, 2022, now Pat. No. 11,595,746.

(51) Int. Cl.
*H04R 5/00* (2006.01)
*H04R 25/00* (2006.01)

(52) U.S. Cl.
CPC ......... *H04R 25/558* (2013.01); *H04R 25/305* (2013.01); *H04R 25/505* (2013.01); *H04R 25/554* (2013.01); *H04R 25/609* (2019.05); *H04R 2225/31* (2013.01); *H04R 2225/33* (2013.01); *H04R 2225/55* (2013.01)

(58) Field of Classification Search
CPC ... H04R 25/558; H04R 25/609; H04R 25/505
See application file for complete search history.

(56) References Cited

U.S. PATENT DOCUMENTS

| | | | | |
|---|---|---|---|---|
| 2012/0282976 | A1* | 11/2012 | Suhami | G10K 11/17857 381/314 |
| 2014/0335280 | A1* | 11/2014 | Musser | C09D 5/30 427/430.1 |
| 2016/0166203 | A1* | 6/2016 | Goldstein | A61B 5/02055 600/509 |
| 2017/0245065 | A1* | 8/2017 | Suhami | H04R 25/405 |
| 2018/0078422 | A1* | 3/2018 | Dierenbach | A61F 11/045 |
| 2019/0028795 | A1* | 1/2019 | Hirsch | H04R 1/028 |
| 2021/0152961 | A1* | 5/2021 | Christensen | H04R 25/604 |
| 2021/0185464 | A1* | 6/2021 | Christensen | H04R 25/652 |
| 2021/0354370 | A1* | 11/2021 | Wolter | C08G 75/045 |
| 2022/0272467 | A1* | 8/2022 | Gentry | B33Y 80/00 |

* cited by examiner

*Primary Examiner* — Simon King
(74) *Attorney, Agent, or Firm* — Italia IP; James A. Italia

(57) ABSTRACT

A hearing aid is shown and described. The hearing aid includes a body portion having a microphone, an earplug in communication with the body portion having a speaker, a battery and visible and audible beacons disposed in the body portion, and circuitry or programming designed to provide a spatialization function. The hearing aid includes a material having coloring corresponding to the skin pigmentation of a user. The hearing aid is designed to maintain a reserve level of battery power. The hearing aid is waterproof, and can be controlled by a remote controller or cellular telephone application.

14 Claims, 8 Drawing Sheets

FIG. 8A
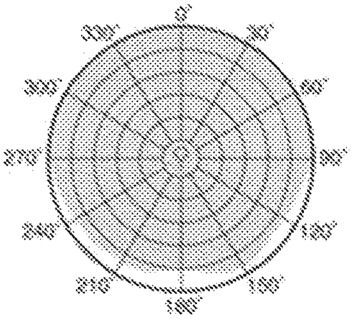
FIG. 8B
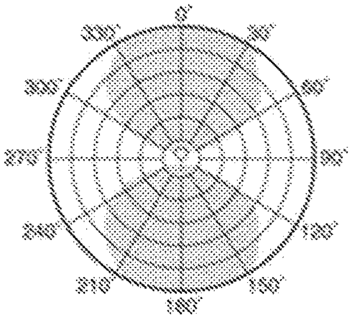
FIG. 8C
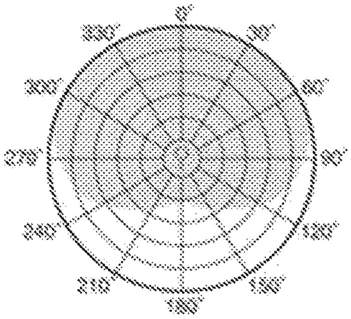
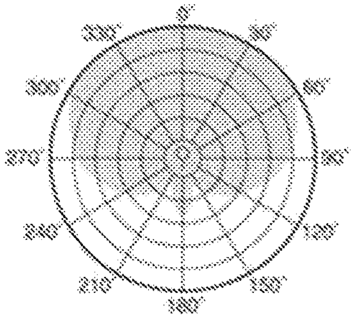
FIG. 8D
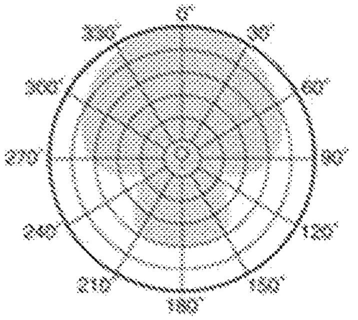
FIG. 8E

EAR MOUNTED AUDIO DEVICES CONTROLLABLE BY REMOTE CONTROL

CROSS-REFERENCE TO RELATED APPLICATIONS

The present application a Continuation application of U.S. patent application Ser. No. 17/954,106, filed Sep. 27, 2022, which was a Continuation-in-Part (CIP) application of U.S. patent application Ser. No. 17/691,020, filed on Mar. 9, 2022, the disclosure of both applications are hereby incorporated by reference in their entirety.

FIELD OF THE INVENTION

The present invention relates to sound transmission, and more particularly, to improving manual adjustment control for ear mounted audio devices such as hearing aids.

BACKGROUND OF THE INVENTION

Technology for controlling head worn sound delivery systems such as hearing aids and headsets allows for adjustment of various parameters of delivered sound, where parameters encompass sound volume, various aspects of sound characteristics, and on-off control. As head worn systems are commercially available either as stand-alone items or alternatively as separate from sound source equipment with which they work, manual controls for adjusting the various parameters are usually built into the head worn system.

It can be inconvenient or objectionably difficult to gain access to some controls with the sound delivery system in place on the head of the user, because there is typically no direct line of sight enabling the desired control to be operated. Also, some controls are physically so small and may be located so close to others that it is difficult to operate them manually despite controls being operated by simple pressing of the input interface element.

There remains a need to enable ready operation of sound parameter controls that do not require removal of a sound delivery system from the head.

SUMMARY OF THE INVENTION

The present invention addresses the above stated need by providing a hand held remote or independent controller separate from an associated head worn sound delivery system. The remote controller has pushbutton type controls and communicates wirelessly with the controlled sound delivery system. The remote controller may be a dedicated device or alternatively, may be implemented as an application residing in a cellular telephone or other portable personal communications device.

An object of the present invention, where the sound delivery system uses at least one hearing aid, is to reduce the number or bulk of components on a hearing aid, or both, so that the hearing aid is of minimal size and less conspicuous than present day hearing aids.

It is an object of the invention to relieve a user of the necessity of removing, reposition, replacing, or moving an ear contracting sound delivery device in order to initiate, extinguish, or modify sounds delivered by the sound delivery device.

Also provided is a hearing aid which includes a body portion having a microphone, an earplug in communication with the body portion having a speaker, a battery and visible and audible beacons disposed in the body portion, and circuitry or programming designed to provide a spatialization function. The hearing aid includes a material having coloring corresponding to the skin pigmentation of a user. The hearing aid is designed to maintain a reserve level of battery power. The hearing aid is waterproof. The hearing aid can be controlled by the remote controller or cellular telephone application. The present invention provides improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIGS. 8A-8E are diagrams showing how hearing aid reception can be changed in response to the user preference.

DETAILED DESCRIPTION

Figure 1:
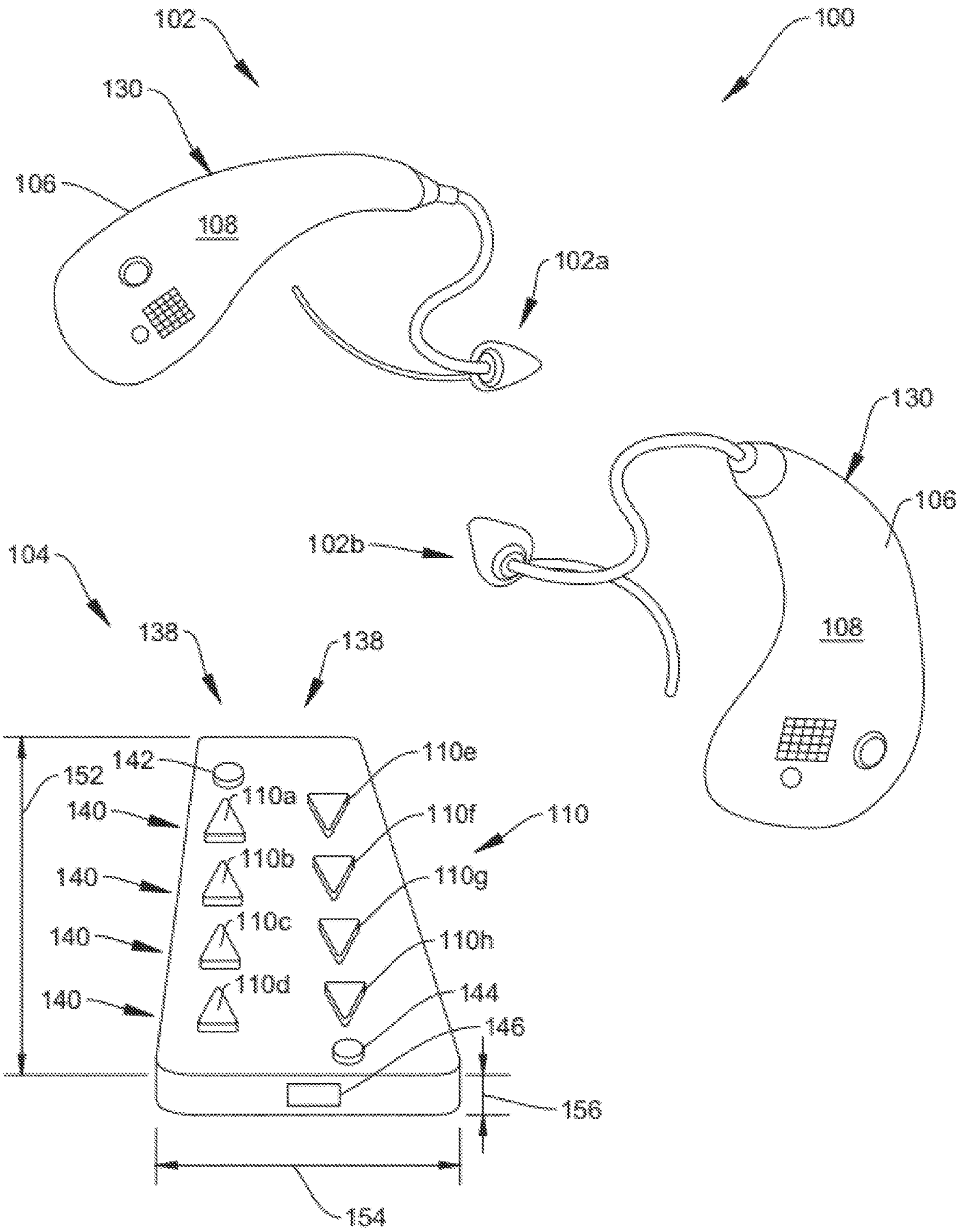
FIG. 1 is a perspective view of components of a first embodiment of the invention, showing an exemplary outer appearance of these components.
Figure 2:
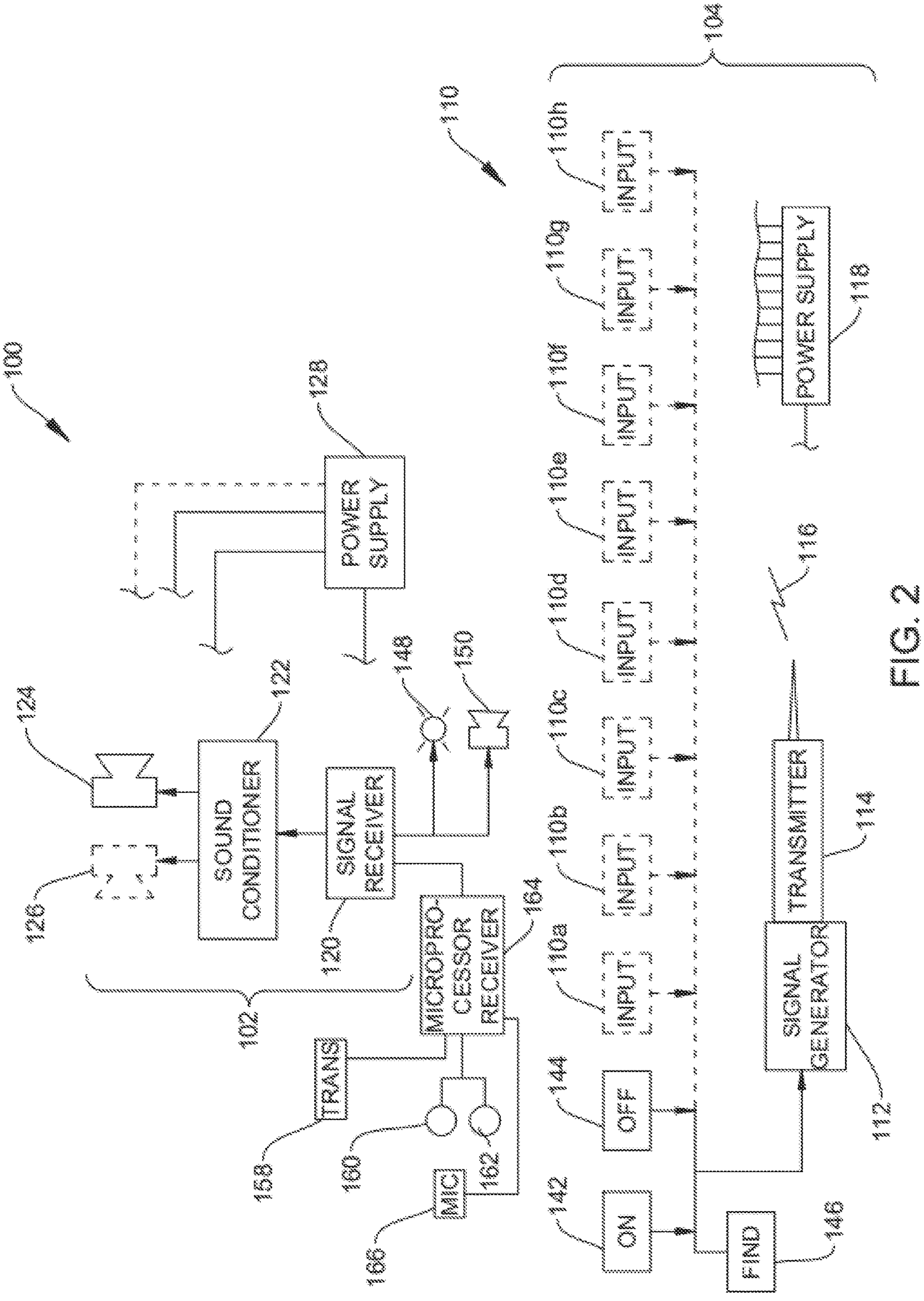
FIG. 2 is a schematic diagram of electrically operated components of the invention, wherein arrowheads where used indicate which components provide inputs to associated components.

In this description, FIG. 1 shows an outer appearance of referenced components of one specific embodiment of the invention, and FIG. 2 schematically shows electrically operated components and electrical connections applicable to various embodiments. In the first embodiment, an ear contacting sound delivery device comprises at least one hearing aid (two are shown, and may be identical or alternatively, may be mirror image of one another). While hearing aids are typically used in pairs, one for each ear, there exist situations in which only one hearing aid is needed. One example is where hearing is impaired in only one ear. Another example is where an observer is monitoring two different speakers or sources of sound, and the need to hear one more clearly arises from time to time.

Some electrical connections are shown truncated in the schematic of FIG. 2. Referring now to FIGS. 1 and 2, according to at least one aspect of the invention, there is shown a combination 100 of an ear contacting sound delivery device 102 comprising at least one of a right speaker 102*a* and a left speaker 102*b* for emitting sound to one or both ears of a user (not shown), and a remote controller 104 physically separate from and independent of ear contacting sound delivery device 102. Remote controller 104 is configured to adjust sounds emitted by right speaker 102*a* and left speaker 102*b*. Remote controller 104 may comprise a body 106 having an external surface 108, at least two sound control input operators 110 accessible to haptic inputs on external surface 108 (FIG. 1) of body 106 (FIG. 1), a signal generator 112 and transmitter 114 for transmitting at least one control signal 116 responsively to the user operating sound control input operators 110, and a power supply 118 operably connected to sound control input operators 110, signal generator 112, and transmitter 114.

Referring to the schematic shown in FIG. 2, sound delivery device 102 may comprise a signal receiver 120 for receiving signals 116 transmitted by signal generator 112, at least one speaker 124 or 126, and at least one sound conditioner 122 configured to modify sound outputs of, selectively, a right speaker 124 and a left speaker 126, responsively to signals 116 transmitted by signal generator 112, and a power supply 128 operably connected to signal receiver 120, the at least one speaker 124 (and optionally, speaker 126), and sound conditioner 122.

Orientational terms such as left, right, top, bottom, vertical, and horizontal refer to the subject drawing as viewed by an observer. The drawing figures depict their subject matter in orientations of normal use, which could obviously change with changes in orientation and position of the novel remote control. Therefore, orientational terms must be understood to provide semantic basis for purposes of description, and do not limit the invention or its component parts in any particular way.

Communications using signals 116 may use Wi-Fi or Bluetooth or other low powered systems.

In the various embodiments encompassed herein, that portion of the novel system delivering sound to the user contacts the ears, with sound projected toward or into the ear canal. Contact of the ear is held to satisfy the description as “head worn” as the ears are connected to the head of the user.

The various subcomponents of the invention are known. Invention lies in arrangement of these subcomponents to function as a sound delivery device (i.e., the head worn component) and a remote controller thereof. Electrical connections are shown functionally in FIG. 2 and in textual description, rather than being shown literally. For example, drawn connections will be understood to encompass that number of individual electrical conductors required for operability of the recited components. In a similar vein, the phrase “configured to” will be understood to encompass all necessary conductors, connections, and supporting apparatus required for operation as described. Similarly, components shown abutting will be understood to be complete, operable, and functionally connected.

Sound adjustment may encompass volume control and white noise control, and in embodiments other than that of FIG. 1, sound characteristics such as treble and base levels, among others. These and other sound characteristics and their control are widely known in the sound reproduction arts.

The at least two sound control operators, if only two were present, would include “on” and “off” operators shown at the lower left of FIG. 2. Functions of operators 110 shown as optional in FIG. 2 due to rendering in dashed lines will be specified hereinafter.

Remote controller 104 may be configured to receive manual input commands corresponding to at least two different aspects of sound. Sound conditioner 122 may be configured to modify sound outputs according to the manual input commands and modify sound outputs of right speaker 124 independently of left speaker 126. Aspects of sound include right-left volume proportion or balance, treble-bass adjustment, signal focusing, etc.

In the embodiment of FIG. 1, ear contacting sound delivery device 102 comprises hearing aids 130 configured to engage an ear canal of a user, and the at least two sound control input operators 110 of remote controller 104 comprise push buttons each responsive to being pressed to operate. Locating input operators 110 on remote controller 104 reduces complication and bulk of hearing aids 130, with the result that hearing aids 130 may be smaller and less conspicuous than corresponding prior art hearing aids.

Figure 3:
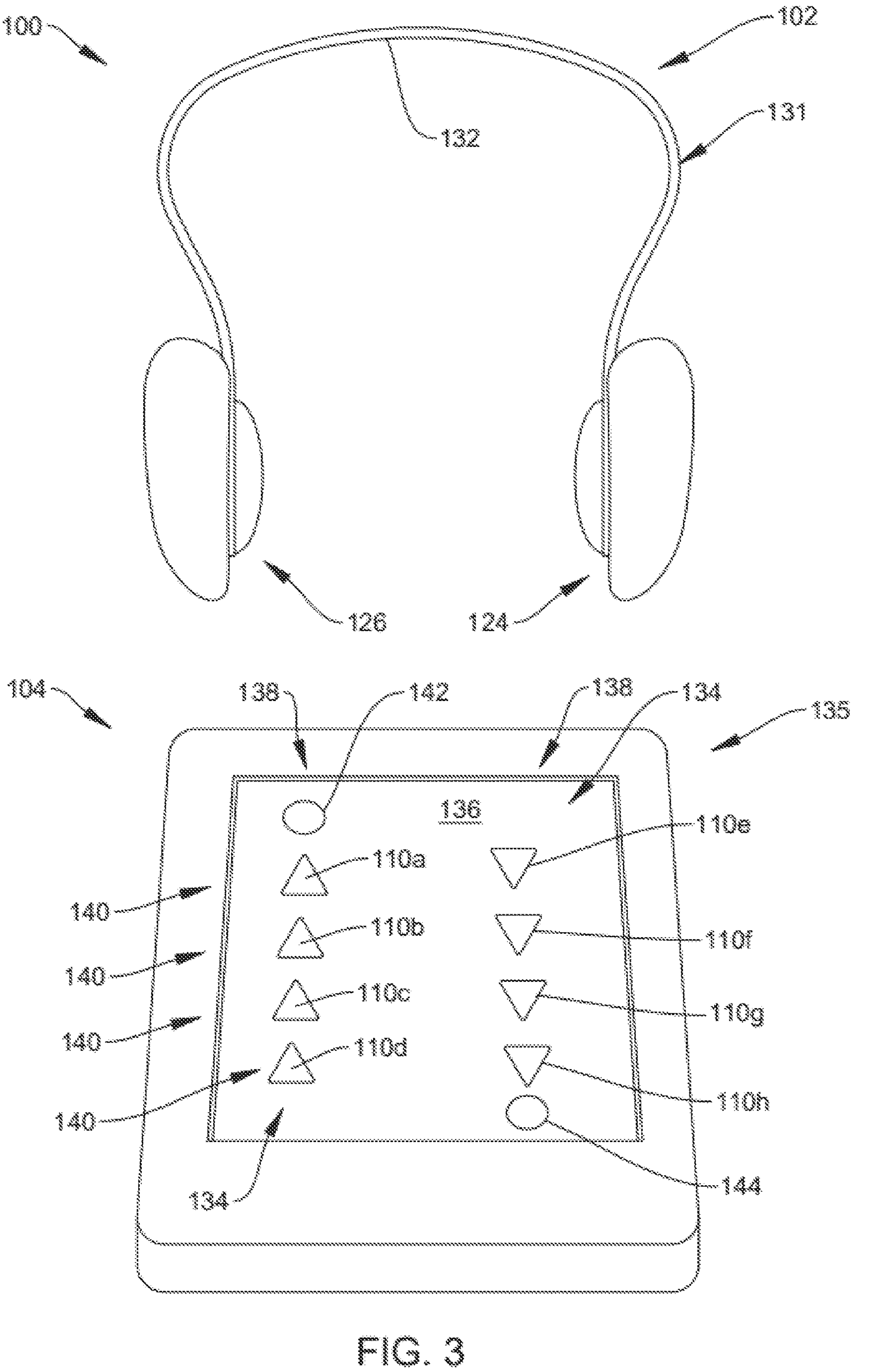
FIG. 3 is a perspective view of components of a second embodiment of the invention, showing an exemplary outer appearance of these components.
Figure 4:
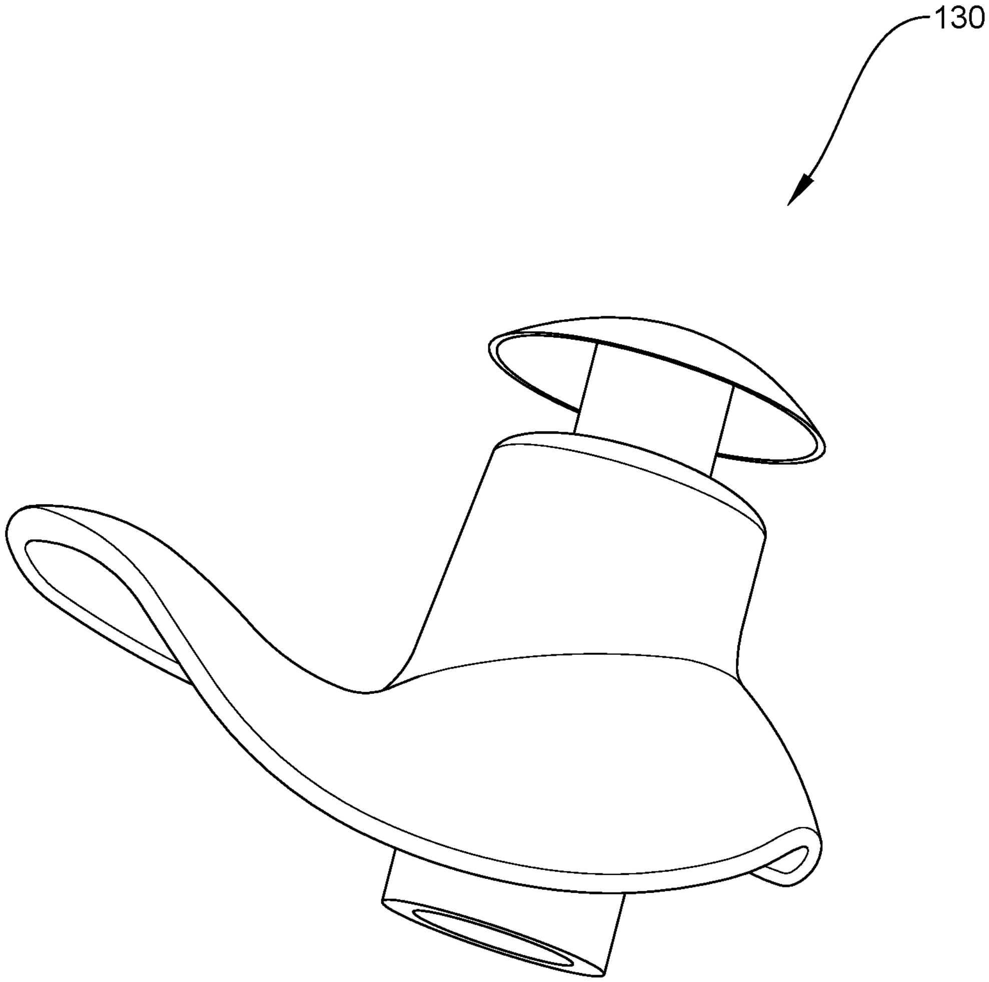
FIGS. 4-7 are images showing views of a model hearing aid design according to various perspectives according to one implementation.
Figure 5:
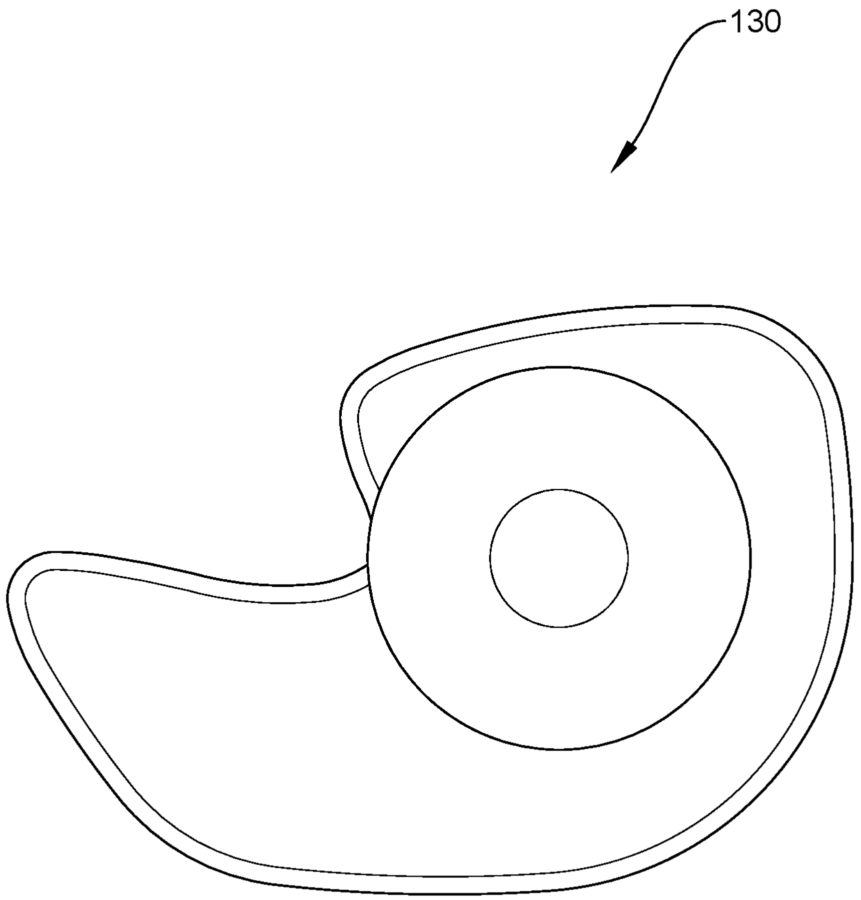
Figure 6:
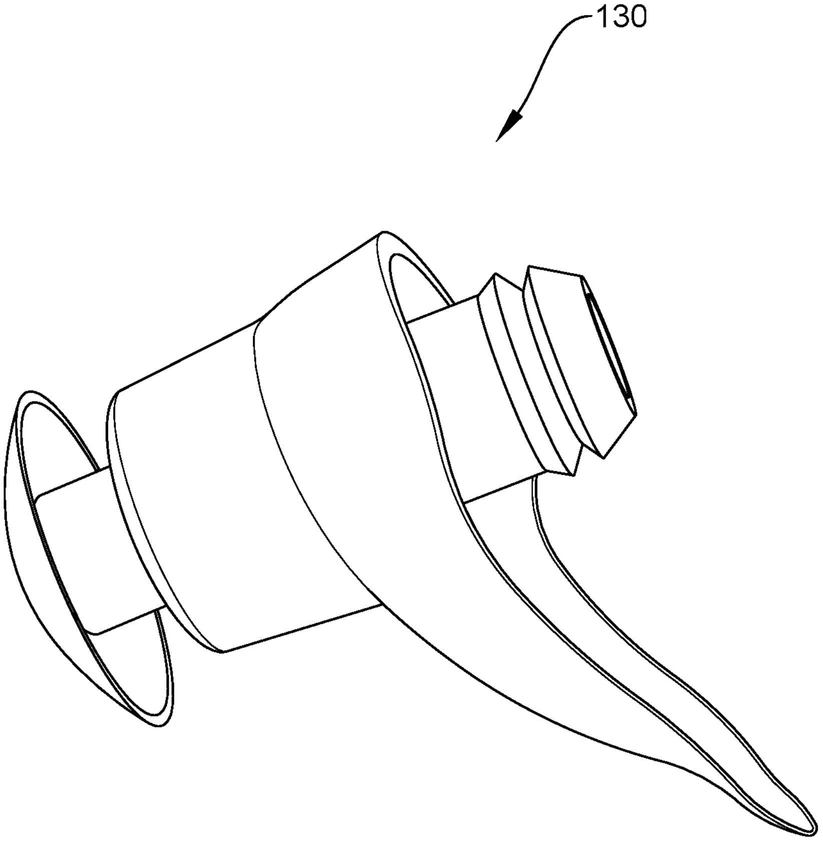
Figure 7:
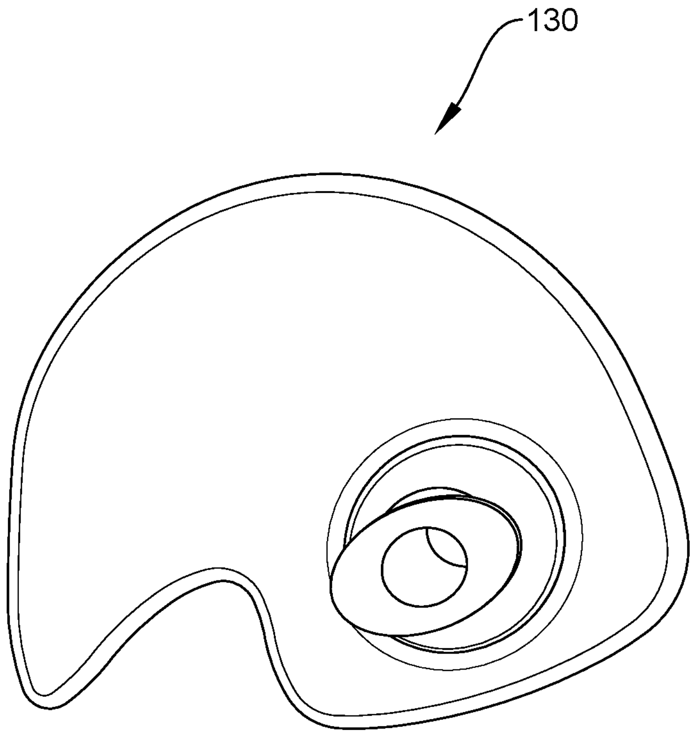

Turning now to FIG. 3, ear contacting sound delivery device 102 is a headset 131 including right ear contacting speaker 124, left ear contacting speaker 126, and a spanning member 132 connecting right ear contacting speaker 124 and left ear contacting speaker 126 and maintaining right ear contacting speaker 124 against the right ear of the user and maintaining left ear contacting speaker 126 against the left ear of the user. The at least two sound control input operators 110 of remote controller 104 comprise push buttons each responsive to being pressed to operate. In the embodiment of FIG. 3, wherein ear contacting sound delivery device 102 is a hearing aid 130 configured to engage an ear canal of a user, remote controller 104 is a cellular telephone 135. The at least two sound control input operators 110 of remote controller 104 comprise icons 134 on a touch responsive screen 136 of the cellular telephone, each responsive to being contacted by a finger of the user to operate. The cellular telephone includes computer instructions to effect transmission of operating signals 116 from the cellular telephone to signal receiver 120 of the headset 131. It should be understood that ear contacting sound delivery device 102, its signal receiver 120, its sound conditioner 122, and its power supply 128 are present in both embodiments using hearing aids, and also in embodiments using headsets. The same holds true of the corresponding components of remote controller 104 of FIG. 3 relative to those of FIG. 2 as these components are inherent in a cellular telephone. Icons 134 are counterparts of the push buttons of controller 104 not only in function but also in that they operate responsive to pressure of finger pressure, and thus may be regarded as push buttons. The computer instruction includes a computer executable or implementable program or application which is functional to implement data processing steps for accomplishing functions listed herein.

It should be made explicit that in an unillustrated embodiment of the invention, hearing aids 130 could be used with a cellular telephone serving as remote controller 104 (provided of course that a suitable controlling application has been downloaded thereto). Similarly, the physical, stand-alone remote controller 104 of FIG. 1 could be used to control a headset 131.

Where remote controller 104 is a cellular telephone, the plurality of sound control input operators 110 comprise icons 134 on touch responsive screen 136 of the cellular telephone, each responsive to being contacted by a finger of the user to operate. The cellular telephone includes computer instructions to effect transmission of operating signals from the cellular telephone to signal receiver 120 of the hearing aid.

Combination 100 may be provided with a locator feature for locating a misplaced hearing aid. To this end, combination 100 may further comprise a locator push button 146 on remote controller 104. Push button 146 is configured to generate at least one of an audible signal and a visible signal in the hearing aid. Combination 100 also may comprise at least one of a visible beacon 148 and an audible beacon 150 on the hearing aid. Locator push button 146 generates a signal 116 from signal generator 112 and transmitted by transmitter 114. Corresponding operating signals are then generated by signal receiver 120 of sound delivery device 102, or alternatively by sound conditioner 122 or any other component having processing capability of turning signal 116 into an operating signal for visible and audible beacons 148, 150.

The invention may also be viewed as remote controller 104 of FIG. 1. In FIG. 1, there is seen remote controller 104 for an ear contacting sound delivery device 102 (which may be either the hearing aid of FIG. 1 or the headset 131 of FIG. 3), having at least one of right speaker 124 for mounting in contact with a right ear of a user and left speaker 126 for mounting in contact with a left ear of the user. Remote controller 104 may comprise body 106 having external surface 108, at least ten sound control input operators 110 accessible to haptic inputs on external surface 108 of body 106, signal generator 112 and transmitter 114 configured to transmit a plurality of control signals 116 responsively to the user operating sound control input operators 110, wherein signal generator 112 is in communication with sound control input operators 110; and power supply 128 operably connected to sound control input operators 110 and signal generator, 112, and transmitter 114. Ten sound control input operators 110 are shown in FIG. 1. The ten functions enabled in the arrangement of FIG. 1 include "on" and "off", increasing and decreasing volume for the right and left speakers 124, 126 (control is for each side independently), and increasing and decreasing white noise levels for right and left speakers. This arrangement satisfies control needs for typical hearing aids.

Remote controller 104 may be configured to receive manual input commands corresponding to a plurality of different aspects of sound, and sound conditioner 122, sound focuser, may be configured to modify sound outputs according to the manual input commands and modify sound outputs of right speaker 124 independently of left speaker 126. Sound volume and white noise levels provide one example of modifying sound outputs, but other schemes exist. For example, where the sound delivery device is a stereophonic headset 131 (FIG. 2), aspects of sound may include right-left side volume balance and bass-treble adjustments.

The at least ten sound control input operators 110 of remote controller 104 may comprise push buttons each responsive to being pressed to operate. This causes the input operators to conform to conventional practice in hearing aids.

In an option which replaces separate "on" and "off" push buttons with one, one of sound control input operators 110 is an on-off pushbutton utilizing toggle logic. This reduces the number of control operators 110 necessary and utilizes a known control scheme.

As seen in both FIGS. 1 and 3, sound control input operators 110 (including icons 134 of FIG. 3) may be arrayed on one flat surface (i.e., external surface 108) of body 106 in two vertical columns and a plurality of horizontal rows. Sound control input operators 110 (and icons 134) may include a first sound control input operator 110*a* (shown in FIG. 1 and may also apply to FIG. 3) configured to raise sound volume of right speaker 124, a second sound control input operator 110*b* configured to raise sound volume of left speaker 126, a third sound control input operator 110*c* configured to raise white noise volume of right speaker 124, a fourth sound control input operator 110*d* configured to raise white noise volume of left speaker 126, a fifth sound control input operator 110*e* configured to lower sound volume of right speaker 124, a sixth sound control input operator 110*f* configured to lower sound volume of left speaker 126, a seventh sound control input operator 110*g* configured to lower white noise volume of right speaker 124, and an eighth sound control input operator 110*h* configured to lower white noise volume of left speaker 126. In this scheme, all parameter increasing push buttons are on the left. This is one of a number of possible logic schemes of sound control input operators 110. It would also be possible for example to locate all push buttons controlling left speaker 126 on the left of the array, and all push buttons controlling right speaker 124 on the right.

Unless otherwise indicated, the terms "first", "second", etc., are used herein merely as labels, and are not intended to impose ordinal, positional, or hierarchical requirements on the items to which these terms refer. Moreover, reference to, e.g., a "second" item does not either require or preclude the existence of, e.g., a "first" or lower-numbered item, and/or, e.g., a "third" or higher-numbered item. This pertains to both components of the various embodiments and also to the embodiments themselves.

In the array illustrated in FIGS. 1 and 3, first sound control input operator 110*a*, second sound control input operator 110*b*, third sound control input operator 110*c*, and fourth sound control input operator 110*d* occupy one vertical column 138. Fifth sound control operator 110*e*, sixth sound control input operator 110*f*, seventh sound control input operator 110*g*, and eighth sound control input operator 110*h* occupy another vertical column 139 adjacent the other vertical column 138.

Remote controller 104 further includes an input operator 142 configured to turn right speaker 124 and left speaker 126 on. "On" input operator 142 may be located at the top of a left column 138 and an "off" input operator 144 configured to turn right speaker 124 and left speaker 126 off "Off" input operator 144 may be located at the bottom of a right column 138. This arrangement places increase and decrease functions for any one side intuitively to the right or left of one another.

In the above-described array, left column 138 may be staggered vertically relative to right column 138, wherein there is no input operator to the right of the "on" input operator and no input operator to the left of the "off" input operator. This dissimilarity imparts identity and recognizability to the "on" and "off" functions.

Icons 134 associated with a function increasing a control parameter may appear on touch responsive screen 136 as arrowheads pointing upwardly, and icons 134 associated with a function decreasing a control parameter may appear on touch responsive screen 136 as arrowheads pointing downwardly. This arrangement is both familiar and also intuitive.

In a further feature, and referring to FIG. 2, an ear contacting sound delivery device may be modified to facilitate hands free telephone calls in the manner of a wireless Bluetooth headphone. To this end, hearing aid 130 may serve as an ear contacting sound delivery device 102 comprising signal receiver 120, sound conditioner 122, at least one of right speaker 124 and left speaker 126, a transmitter 158, an on-off control 160, a sound volume control 162, power supply 128, a microphone 166, and a microprocessor 164 in communication with signal receiver 120, sound conditioner 122, the at least one of right speaker 124 and left speaker 126, transmitter 158, on-off control 160, sound volume control 162, power supply 128 and microphone 166. Sounds received by microphone 166 are transmitted to transmitter 158 for subsequent transmission to a cellular telephone (e.g., cellular telephone 135), thereby enabling a user to conduct a telephone conversation without having to hold cellular telephone 135.

Parameters of sound delivery such as volume that are subject to increase and decrease via controls may be continuously adjusted, or alternatively, adjusted in discrete steps.

In a preferred implementation, and referring again to FIG. 1, remote controller 104 may have a length 152 of two and one half inches, a width 154 of one inch, and a thickness 156 of one quarter inch.

Hearing aid implementations of the invention can include the following. The material of the hearing aids can be colored to match the skin pigmentation of the user of the hearing aid, ranging from a low to a high level of melanin pigmentation. The material can be or include a polymer and can be colored through the use of commercial dyes used in the plastic manufacturing arts. The hearing aids can have a shape according to the model hearing aid design depicted in FIGS. 4-7. The design shown in FIGS. 4-7 is merely an example and other variations are possible. The hearing aids 130 can have an earplug or dome having a speaker. The earplug or dome fits partially within the external auditory canal to provide amplified sound to the user. The hearing aid includes a curvilinear body portion above the earplug or dome that is designed to fit within the portion of the outer ear leading into the external auditory canal. The combination of the matching skin color and shape greatly reduces the visibility of the hearing aid in comparison to conventional hearing aids. Further, the tab on the exterior of the hearing aid 130 can be removed to make the hearing aid even more discrete. The shape of the hearing aid can also be custom fit to the user by first creating a mold of the depression surrounding the user's external auditory canal and a portion of the external auditory canal. The mold can be obtained by a flexible putty material inserted into the user's ear. The mold can then be subsequently hardened and used to recreate a shape of a hearing aid that fits securely and discretely into the ear of the individual user. The hearing aid can be manufactured from the custom mold by techniques used for creating plastic components such as injection molding or 3D printing. Each hearing aid (i.e., left and right hearing aids) having the shape depicted in FIGS. 4-7 or custom-shaped can include one or more components described in previous figures, including a signal receiver, sound conditioner, a speaker, a transmitter, an on-off control, a sound volume control, a power supply such as a battery, a microphone, and a microprocessor in communication with the signal receiver. These components can be included externally or internally within the design of the hearing aid according to practices known in the art, and can be activated or controlled by the remote controller or cellular telephone application described above. For example, a speaker can be fabricated within the earplug or dome inserted into the user's ear canal, the signal receiver can be fabricated within the body of the hearing aid, and microphones can be situated in the curvilinear portion that is disposed outside the ear canal when fitted in the user's ear. Control functions such as the volume, white noise, treble, bass, and other auditory features of the left and right hearing aids, on-off function, and locator or find function can be controlled by the remote controller or cellular telephone application through input operators as previously described. A signal is generated by remote controller or cellular telephone in response to activation of input operators and is received by the signal receiver of the hearing aid to control various functions. Having the control functions situated remotely from the hearing aid greatly reduces the overall size of the hearing aid so that it is much less noticeable in comparison to conventional hearing aids.

Hearing aid implementations of the invention can also include a spatialization or focusing function. The spatialization function provides for the localization of sound sources so that the user can determine where sound received by the hearing aid is coming from. The spatialization function can be implemented as circuitry and/or computer programming stored on a computer-readable memory which processes audio received by the microphones of the hearing aid. The circuitry and/or memory can be situated in the body portion of the hearing aid or within the remote controller, or can include the existing memory or circuitry of the cellular telephone, or a combination of these. In one implementation, the hearing aid includes two audio channels provided by a left microphone situated on a left hearing aid and right microphone situated on a right hearing aid. Input from the two audio channels is processed by the circuitry or computer programming to determine the relative strength or level of audio signal of each channel. For example, the left channel may represent 40% of the total audio signal received by the two channels, and the right channel may represent 60% of the total audio signal. After determining the ratio between the left audio signal and the right audio signal, the circuitry or computer programming then sends a command to the sound conditioner to adjust the level of output or volume between the left audio speaker and right audio speaker accordingly. In this way, the level of output can be adjusted according to ratios of 0/100, 10/90, 20/80, 30/70, 40/60, 50/50, 60/40, 70/30, 80/20, 90/10, 100/0, between the left audio speaker and right audio speaker according to the level of input provided by the left microphone and right microphone. This allows the user to determine the location or source of the sound, so that confusion is minimized with respect to where the sound is coming from. For example, if there are two interlocutors speaking with a user of the hearing aid, one on either side of the user, audio predominately coming from the left speaker would indicate that the interlocutor on the left side of the user is speaking. The spatialization function can occur automatically or can be turned on and off by the user on the remote controller or cellular telephone application by way of an input operator. The auditory spatialization function reproduces a natural representation of the acoustic environment surrounding the user.

In some implementations, the spatialization function is executed visually in conjunction with a display. The display can be implemented on the remote controller or alternatively, the spatialization function can be implemented on the display of the cellular telephone having the remote controller application installed. The display can show a field with an icon in the center indicating the position of the user of the hearing aid. The field surrounding the icon represents the auditory space surrounding the user of the hearing aid. Audio sources can be shown on the display as different symbols that represent the spatial positioning of the audio sources relative to the user. The symbols can change position as the audio sources move relative to the user, or can appear or disappear as sound is generated or ceases. Multiple symbols on the display represent multiple audio sources surrounding the user, including in front of, behind, to the left of, and to the right of the user, or any combination of these. The symbols can have different colors or shapes and can be sized according to the level of audio provided by the audio source in real time. The visual spatialization function provides a graphic display of the acoustic environment surrounding the user. The visual spatialization function can be implemented as circuitry or computer programming in conjunction with the audio spatialization function discussed above, or separately from the audio spatialization function, and can operate automatically or be turned on and off by an input operator. Other modalities for the spatialization function such as a tactile modality as a stand-alone or adjunct function are also contemplated.

Further, it is also contemplated that pre-set spatialization features can be preprogrammed in the remote control or cellular telephone application such that the desired focus of the sound received by the user can be pre-selected given the environment. Examples of the pre-set spatialization features are shown in FIGS. 8A through 8E. The example in FIG. 8A shows a generic pre-set that would enable the user to obtain signals in a 360-degree array in a manner typical of normal hearing function. In contrast, FIG. 8D shows a pre-set where the user would receive a focused signal from signals that are generated in front of the user versus behind the user. Such a pre-set in FIG. 8D would be particularly helpful in settings like movie theaters or in classrooms where the user would want to focus its listening capabilities to signal generators that are of interest rather than noises or chatter that may be behind them.

In addition, it is further contemplated that the spatialization or focus function could also be used to teach the hearing aid the voices that it has previously recognized as desirable so that it can ensure that the desired signal is transmitted, while less desirable signals are minimized. For example, a grandparent could set a preference to a signal received from a grandchild while they are speaking as a way of teaching the system that the voice of this frequency is more desirable to others. This learned function could then be applied automatically whenever the child's voice is received by the user's hearing aid, such that the system would recognize the pre-set learned frequency and thereby transmit that signal over the other less desirable additional auditory signals received by the system.

It is also contemplated that the hearing aid could receive auditory signals from a foreign language speaker that could then be translated by the processor contained in the remote control or cellular telephone application that would allow real-time or near real-time translation of the foreign language to the language understood by hearing aid user. The user would be able to select the input and output language, or the input language could be automatically detected by the system. This would allow the user to understand what a foreign speaker was saying to assist in communication between individuals. In such a situation where translation is occurring, it would be preferable for the received signal from the foreign speaker to be minimized such that the user is able to hear the translation emitting from the hearing aid rather than also hearing the foreign speaker. This would assist the user's understanding as he or she would not hear both translation and the foreign speaker at the same or nearly the same time. Essentially, the foreign speaker would be partially muted for the user and the translation would be more prominent. The level between the foreign speaker and the translation could be adjusted by the user using the remote control or cellular telephone application.

It is further contemplated that the system would be able to take the auditory signal received by an individual and "slow it down" so that the user would be able to better understand what was being said in the situation where translation was occurring or even when no translation was occurring. For example, if a particular individual is speaking relatively quickly, the processor could take the signal and slow it down for the user so that user has more time to understand what is being said. For example, if a particularly fast speaker is rattling off a list of required items, the user would be able activate a slowing mechanism whereby the system would transmit it to the user at a slower speed. The degree that the signal is slowed would be selectable as well. In this instance, it would also be desirable to partially mute the fast-speaking individual so that the slowed transmission would be more prominent. The level between the fast speaker and the slowed output could be adjusted by the user using the remote or cellular telephone application.

Hearing aid implementations can also be equipped with visible and audible beacons as previously described. The visible and audible beacons allow for location of the hearing aids if misplaced. The visible and audible beacons are activated by the remote controller or cellular telephone application through input operators by the user to signal the location of the hearing aid. A power source such as a battery of the hearing aid can be designed to have a fixed amount of reserve power when the battery is run down. The fixed amount of reserve battery power can be implemented by a sensor that detects when the battery power has drawn down to a certain voltage (e.g., 1%, 5%, 10% of full battery storage) which sends a signal to the on-off control to shut off the hearing device at that level of battery power. The hearing aid can emit an audible signal from the audible beacon when it shuts off. When the hearing aid stops working, the user can still activate the location beacons to find the hearing aid such that the reserve battery power supplies the visible and audible beacons for a brief amount of time (e.g., 10 second, 20 seconds, 30 seconds, 40 seconds, 50 seconds, 60 seconds) so that the hearing aid can be located.

In some implementations, the hearing aid is waterproof Waterproofing can be achieved by sealing the entire hearing aid compartment so that no space exists where water can gain entry. Appropriate sealants such as silicones (e.g., silanes, siloxanes, and silazanes), polyurethane, polyvinylchloride, and natural and synthetic rubber, can be used to line junctions where parts of the hearing aid fit together, or can coat water-sensitive components within the hearing aid as moisture barriers. Alternatively, the entire hearing aid compartment can be sealed such that no junction on the hearing aid exists.

Applications and computer programming can be stored in computer memory on a non-transitory computer readable storage medium or media disposed on the remote controller, cellular telephone and/or hearing aid. The applications/computer programming can be programmed in any suitable programming language, such as JavaScript, C, C#, C++, Java, Python, Perl, Pascal, Ruby, Swift, Visual Basic, and Objective C. Non-transitory computer-readable storage medium (or media) can include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), nonvolatile ROM, and RAM. The present invention is susceptible to modifications and variations which may be introduced thereto without departing from the inventive concepts. For example, it is contemplated that the ear mounted hearing devices could be charged using either near-field or far-field charging technology such that a user's separate remote control or cellular device would be able to charge the battery contained in hearing devices in wireless manner. In addition, for use with general purpose headset ear speakers, it would be possible to add manual controllers of functions other than those explicitly mentioned herein, such as a balance control for increasing proportional input selectively to the right speaker and the left speaker of any individual channel of a multi-channel input system, or a treble-bass proportional input to the right speaker and the left speaker, among others. A number of characteristics of audible content are known in the field of sound and music reproduction. Any one of these or any combination of these may be the subject of controls and control operators, as described priorly.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A hearing aid comprising:

a body portion having a microphone;

an earplug in communication with the body portion having a speaker;

a battery and visible and audible beacons disposed within the body portion, wherein the visible and audible beacons are capable of being activated by an external remote controller or cellular telephone application;

wherein the hearing aid comprises a material having coloring corresponding to the skin pigmentation of a user; and wherein the hearing aid is designed to maintain a reserve level of battery power.

2. The hearing aid of claim 1, wherein the hearing aid is designed to maintain a reserve level of battery power, and wherein the hearing aid comprises a sensor in communication with the battery which can detect when the battery is run down to the reserve level of power.

3. The hearing aid of claim 2, wherein the sensor is configured to send a signal to an on-off switch to shut off the hearing aid when the sensor detects that the battery is run down to the reserve level of power.

4. The hearing aid of claim 3, wherein the reserve level of power of the battery is capable of supplying sufficient power for activation of the visible and audible beacons.

5. The hearing aid of claim 1, further comprising circuitry or programming designed to provide a spatialization function, wherein the spatialization function is designed to locate the position of an auditory source or sources through auditory adjustment.

6. The hearing aid of claim 5, wherein the auditory adjustment comprises changing the auditory output of the speaker of the hearing aid according to a level of input received by the microphone.

7. The hearing aid of claim 1, further comprising circuitry or programming designed to provide a spatialization function, wherein the spatialization function is designed to locate the position of an auditory source or sources through visual indicators.

8. The hearing aid of claim 7, wherein the visual indicators are displayed on a display.

9. The hearing aid of claim 1, wherein shapes of the body portion and earplug are custom manufactured to fit the user's ear.

10. The hearing aid of claim 9, wherein shapes of the body portion and earplug are determined by a mold made of a portion of the user's ear.

11. The hearing aid of claim 1, wherein the hearing aid is controllable by a remote controller.

12. The hearing aid of claim 1, wherein the hearing aid is controllable by a cellular telephone application.

13. The hearing aid of claim 1, wherein the hearing aid further comprises a signal receiver, a sound conditioner and a microprocessor, the sound conditioner and the microprocessor in communication with the signal receiver.

14. The hearing aid of claim 13, wherein the sound conditioner is capable of modifying a sound characteristic of speaker output chosen from characteristics comprising volume, white noise, bass, and treble.

* * * * *